A. V. Ryder
Hay Fork.
No. 57193                               Patented. Aug. 14, 1866.
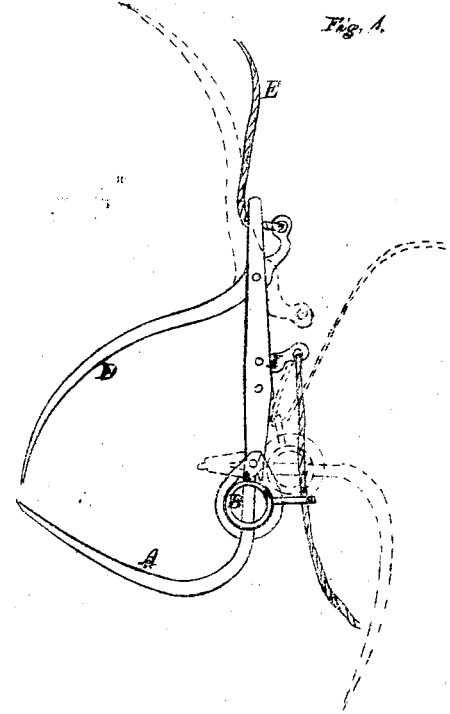
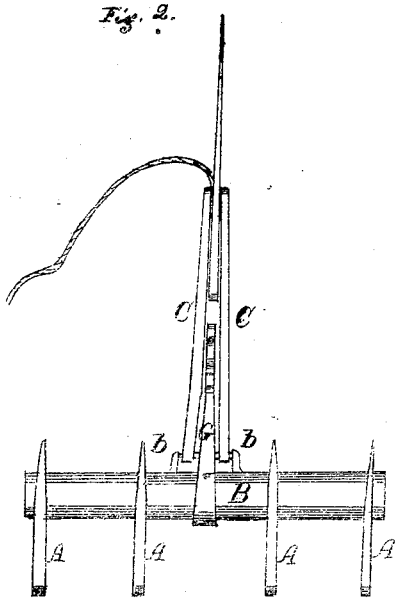
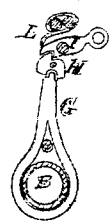

UNITED STATES PATENT OFFICE.

ANDREW V. RYDER, OF GERMANO, OHIO.

IMPROVEMENT IN HORSE HAY-FORKS.

Specification forming part of Letters Patent No. 57,193, dated August 14, 1866.

*To all whom it may concern:*

Be it known that I, A. V. RYDER, of Germano, in the county of Harrison and State of Ohio, have invented a new and useful Improvement in Hay Elevators or Pitchers; and I do hereby declare that the following is a full and exact description thereof, reference being had to the accompanying drawings, and to the letters of reference marked thereon.

My invention consists, first, in a peculiar movable tine for holding the hay upon the main portion of the elevator or fork; second, in an improved arrangement for working, locking, and unlocking the fork; and, thirdly, in a new construction of fork-head.

In the accompanying drawings, Figure 1 is a side view of my improved hay elevator or fork, the motion of the tines being shown in red. Fig. 2 is a front view of the same, the upper tine being open or elevated. Fig. 3 is a cross-section through the head of the rake, and it also shows the tumbler and dog and their connection.

In the construction of my improved hay-elevator or elevating-fork I make the main tines A of the ordinary form and insert them into the head B, which is made tubular for the purpose of giving greater strength with a certain amount of metal.

Into the head of the fork are inserted two studs, $b\ b$, to which are pivoted two arms, C C. These arms are firmly connected by rivets, and carry at their upper ends a tine, D, which is pivoted to the arms and has free motion, as shown in red lines, Fig. 1. A rope, E, attached to this movable tine, is employed for lifting the fork and its load of hay.

Between the two arms C C is a locking-lever, G, which is welded or otherwise firmly connected with the head B of the fork. The upper end of this lock-lever works into a notch in the tumbler H. The tumbler is held by means of a dog, I, Fig. 3, and in turn this dog is pressed downward by means of a spring, L, Fig. 3, so as always to bring the dog to its bearing upon the tumbler.

The operation of my hay-elevator is as follows: The upper tine, D, is opened and the fork inserted; then upon pulling the rope the tine D closes down and holds the fork-load until, by pulling the cord, the dog releases the fork and drops its load.

I do not broadly claim the separate devices above described, but confine my invention to the improvements herein specified and claimed.

Having thus fully described my invention, what I claim, and desire to secure by Letters Patent of the United States, is—

1. The above-described arrangement of the tines A and D with the tubular head B, arms C, and rope E, substantially in the manner and for the purposes set forth.

2. The arrangement of the locking-lever G with the tumbler H and dog I, substantially as described.

ANDREW V. RYDER.

Witnesses:
 I. S. POTTS,
 I. A. ROBERTS.